United States Patent [19]
Götz et al.

[11] Patent Number: 6,040,041
[45] Date of Patent: Mar. 21, 2000

[54] MAGNETIC RECORDING MEDIUM

[75] Inventors: Klaus Götz, Neustadt; Helmut Jakusch, Frankenthal; Werner Loch, Neuried; Erich Hoffmann, Heidelberg; Hans-Georg Gottmann; Hans-Joachim Jenor, both of München; Johann Voit, Gilching, all of Germany

[73] Assignee: EMTEC Magnetics GmbH, Germany

[21] Appl. No.: 09/022,673

[22] Filed: Feb. 12, 1998

[30] Foreign Application Priority Data

Apr. 5, 1997 [DE] Germany .......................... 197 14 161

[51] Int. Cl.$^7$ .................................................. G11B 5/706
[52] U.S. Cl. ........................ 428/216; 428/328; 428/329; 428/694 BM; 428/900
[58] Field of Search .................... 428/216, 328, 428/329, 694 BM, 900

[56] References Cited

U.S. PATENT DOCUMENTS

| | | | |
|---|---|---|---|
| 3,676,217 | 7/1972 | Akashi | 117/239 |
| 4,076,186 | 2/1978 | Oishi et al. | 242/199 |
| 4,109,046 | 8/1978 | Hammon et al. | 42/216 |
| 4,259,392 | 3/1981 | Suzuki | 428/212 |
| 4,340,494 | 7/1982 | Ohlinger et al. | 252/62 |
| 4,367,263 | 1/1983 | Kawahara et al. | 428/336 |
| 4,410,590 | 10/1983 | Kawahara et al. | 428/336 |
| 4,439,795 | 3/1984 | Kitamoto et al. | 360/131 |
| 4,442,159 | 4/1984 | Dezawa et al. | 428/212 |
| 4,670,177 | 6/1987 | Ohlinger et al. | 252/62 |
| 4,741,895 | 5/1988 | Mueller et al. | 423/607 |
| 4,781,851 | 11/1988 | Steck et al. | 252/62 |
| 4,911,997 | 3/1990 | Asai et al. | 428/329 |
| 5,009,877 | 4/1991 | Steck et al. | 423/607 |
| 5,064,549 | 11/1991 | Mueller et al. | 252/62 |
| 5,096,779 | 3/1992 | Mueller et al. | 428/403 |
| 5,164,173 | 11/1992 | Mueller et al. | 423/607 |
| 5,175,048 | 12/1992 | Inaba et al. | 428/213 |
| 5,186,754 | 2/1993 | Umemura et al. | 118/411 |
| 5,378,383 | 1/1995 | Jachow et al. | 252/62 |
| 5,552,544 | 9/1996 | Brana et al. | 544/126 |

FOREIGN PATENT DOCUMENTS

| | | |
|---|---|---|
| 239096 | 3/1987 | European Pat. Off. . |
| 090052 | 6/1987 | European Pat. Off. . |
| 090053 | 6/1987 | European Pat. Off. . |
| 304851 | 8/1988 | European Pat. Off. . |
| 325942 | 1/1989 | European Pat. Off. . |
| 239087 | 11/1990 | European Pat. Off. . |
| 2305247 | 2/1963 | Germany . |
| 3914565 | 5/1989 | Germany . |
| 4005211 | 2/1990 | Germany . |
| 4412611 | 4/1994 | Germany . |
| 1450635 | 9/1976 | United Kingdom . |

*Primary Examiner*—Stevan A. Resan
*Attorney, Agent, or Firm*—Keil & Weinkauf

[57] ABSTRACT

A magnetic recording medium consisting of a nonmagnetic substrate and at least two magnetizable layers which are applied thereon and contain metal oxides as magnetic pigment is described, the pigment of the upper layer having a higher BET value than that in the lower layer. According to the invention, the upper layer has a thickness in the range of 3–5 $\mu$m when dry and the lower layer a thickness in the range of 1.1–3 $\mu$m when dry. Particularly advantageous results are obtained when the magnetic pigment of the upper layer is cobalt-doped $\gamma$—$Fe_2O_3$ and that of the lower layer is acicular $CrO_2$. With the double-layer recording medium obtained according to the invention, in particular the output level at low frequencies is improved without the frequency curve showing the usual depression in the middle.

6 Claims, 1 Drawing Sheet

Fig.
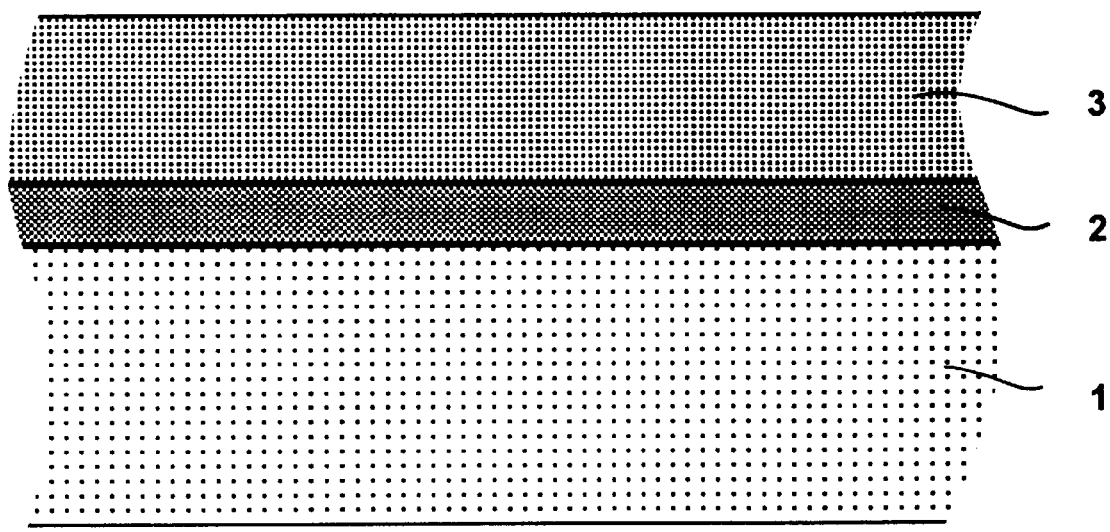

MAGNETIC RECORDING MEDIUM

FIELD OF THE INVENTION

The present invention relates to a magnetic recording medium consisting of a nonmagnetic substrate and at least two magnetic layers applied thereon, both layers containing magnetizable metal oxides as magnetic pigment, the magnetic pigment consisting of cobalt-containing FeOx and present in the uppermost layer having a higher BET value than the magnetic pigment contained in the lowermost layer, and the layer thickness of the uppermost layer being greater than that of the lowermost layer.

BACKGROUND OF THE INVENTION

Recording media of the generic type stated at the outset are known in particular for audio tapes having HiFi capabilities and a low noise level. Use is made of the fact that in particular low-frequency signals magnetize the total magnetic layer whereas high-frequency signals are recorded substantially only at the tape surface.

The recording properties of a magnetic recording medium are essentially determined by the coercive force, the residual induction and the particle fineness of the magnetic pigments used. Thus, the high-frequency signal level can be improved within certain limits by increasing the coercive force, the low-frequency signal level by increasing the residual induction and the noise behavior by increasing particle fineness of the magnetic pigment. Since these pigment properties cannot however be equally pronounced in an individual pigment type, attempts have been made to achieve the desired properties by combining suitable pigments within an individual magnetic layer or by combining several magnetic layers having different pigment types.

DE-A 19 38 006 describes a multilayer tape comprising chromium dioxide as the main component of the upper layer. The object of the invention is to reduce the magnetostrictive behavior of volume-doped cobalt ferrite pigments in the lower layer. According to this publication, audio tapes, for example for the IEC II bias setting, can be produced thereby.

In DE 25 56 188, improved electroacoustic properties are achieved by combining two magnetic layers, the lower layer adjacent to the nonmagnetic substrate containing a chromium dioxide having a BET surface area of from 15 to 25 $m^2/g$ and the upper magnetic layer containing a chromium dioxide having a BET surface area of 26–36 $m^2/g$. An audio tape having improved sensitivity at long wavelengths is thus obtained.

DE 31 48 769 claims a double-layer tape which has a longitudinal orientation of the magnetic acicular pigments in the lower layer and a perpendicular orientation of said pigments in the upper layer.

DE 26 47 941 describes a multilayer tape having an upper layer comprising an iron oxide having a coercive force of 29–32 kA/m and a residual induction of less than 0.15 mTesla and a lower layer comprising a magnetic pigment having a coercive force of 20–40 kA/m and a residual induction of more than 15 mTesla. The aim here is to obtain a standard audio tape having improved noise characteristics.

DE 39 14 565 discloses a double-layer tape in which $CrO_2$ having a coercive force of at least 48.6 kA/m and a BET value of at least 28 $m^2/g$ is present as magnetic pigment in the upper layer and an acicular cobalt ferrite having a coercive force of 44–56 kA/m and a BET value of 26–34 $m^2/g$ is present in the lower layer.

Furthermore, DE 23 05 247, 24 34 940, 28 26 565, 30 04 771, 32 19 779 and 35 14 649 and the European Applications 0 090 052 and 0 090 053 disclose magnetic recording media which have a double-layer structure which is intended to improve the playback properties.

Investigations by the Applicant have shown that the output level in the medium frequency range in many high-quality audio tapes of the IEC-II type is reduced in comparison with the low frequencies, resulting in audible linear distortions, especially in conjunction with the Dolby noise suppression system.

SUMMARY OF THE INVENTION

It is an object of the present invention to provide a recording medium of the generic type stated at the outset which is substantially improved in the abovementioned property, is simple to produce and moreover is substantially improved in the output level at low and at high frequencies.

We have found that this object is achieved, according to the invention, by a recording medium having the features stated in the defining part of the claims.

We have found, surprisingly, that the thickness of the upper layer should be chosen in the range of 3.1–5 μm and that of the lower layer in the range of 1.1–3 μm. In contrast, the vast majority of the magnetic recording media known to date which have a double-layer structure show that the thickness of the upper layer is in general substantially smaller than that of the lower layer. Although DE-A 40 11 279 has disclosed a recording medium produced by the wet-on-wet method and having two magnetizable layers, in which the lower layer has a smaller thickness than the upper layer, it appears from the statements in said patent application that the lower layer has the function of a primer layer which is required to permit the production of the upper thicker layer; furthermore, the thickness of this lower layer is in the range of 0.3–1 μm.

SHORT DESCRIPTION OF THE DRAWING

The figure discloses a cross-sectional view of the magnetic recording medium. 1 is the unmagnetic substrate, 2 means the lower magnetic layer, 3 means the upper magnetic layer.

DETAILED DESCRIPTION OF THE INVENTION

As is evident from the examples below, a recording medium produced according to the invention comprises an upper layer which contains, as magnetic pigment, a cobalt-doped $Fe_2O_3$ having a coercive force of 55–60 kA/m and contains, in the lower layer, an $Fe_2O_3$ which is likewise cobalt-doped and has a coercive force of 50–55 kA/m, the pigment of the upper layer having a BET value of about 40–45 $m^2/g$ and that of the lower layer having a BET value of 20–25 $m^2/g$. Particularly advantageous properties are achieved by a recording medium in which the upper layer contains the abovementioned cobalt-doped $Fe_2O_3$ having the properties described and in which $CrO_2$ having a BET value of 20–25 $m^2/g$ and an $H_c$ value of the order of 40–50 kA/m is used as magnetic pigment in the lower layer. The thicknesses of the upper layer are in the range of 3.1–5 μm and those of the lower layer in the range of 1.1–3 μm.

The preferred ferromagnetic powders used for the upper and the lower layer are powders of ferromagnetic iron oxides of the general formula FeOx, in which x is from 1.33 to 1.5, ie. maghemite (γ—$Fe_2O_3$, x=1.5), magnetite ($Fe_3O_4$, x=1.33) and the berthollide compounds thereof (FeOx, 1.33<x<1.5).

A divalent metal may be added to such ferromagnetic iron oxides. Examples of divalent metals are those of groups VI B, VII B, VIII, I B and II B of the Periodic Table, for example Cr, Mn, Co, Ni, Cu and Zn. The metals are added in amounts of from about 0.5 to about 20, preferably from 0.5 to 10, atom percent, based on the iron metal in the iron oxide. Among the stated divalent metals, cobalt is particularly preferred. If other metals, such as Cr, Mn, Ni, Cu and Zn, are added together with Co, the amount of the other metals is established so that the sum of Co metal and other metals is within the range defined above.

The length/width ratio of the ferromagnetic iron oxide needles is preferably from about 2:1 to about 20:1, in particular more than 5:1, and the total needle length is preferably from about 0.2 to 2.0 µm.

Processes for the preparation of these ferromagnetic iron oxides are described, for example, in Japanese Patent Publications 5009/64, 10307/64 and 39639/73.

Acicular magnetic chromium dioxides, as used in the lower layer according to the particularly preferred embodiment, can be obtained by processes known per se. Among the publications by the same Applicant, EP 0 027 640, 0 198 110, 0 217 352, 0 218 234, 0 238 713, 0 239 087, 0 239 096, 0 268 093, 0 293 685, 0 304 851, 0 325 942, 0 355 755, 0 433 838, 0 548 642, DE 40 05 21 and DE 44 12 611 may be mentioned in particular.

For example, EP-A 0 027 640 describes the preparation of chromium dioxide by synproportionation of chromium(III) and chromium(VI) oxides under hydrothermal conditions. Water is initially taken, for example in a cylindrical reactor, chromic acid is introduced while stirring and, if required, modifiers, such as antimony, selenium, tellurium or compounds thereof, are added. Chromium(III) oxide is then added in the stoichiometric amount required for the synproportionation reaction, with further stirring. The subsequent formation of the chromium dioxide is effected by treating the mixture in a high-pressure reactor at from 100 to 700 bar and at from 240 to 500° C. The reaction for the preparation of $CrO_2$ is complete after from 10 to 50 hours, and the reactors are let down to 0 bar in the course of from 4 to 8 hours, linearly as a function of time. Thereafter, the chromium dioxide is mechanically removed from the reactor container and is stabilized in a known manner. The chromium dioxide thus prepared consists of acicular particles having an average particle length of from 0.1 to 2.0 µm, in particular from 0.4 to 0.9 am, and a length/width ratio of about 15:1 and a specific surface area, determined according to BET, of from 20 to 25 $m^2/g$.

The other properties of the chromium dioxide are similar to those of the pigments used for the known chromium dioxide magnetic tapes. For example, corresponding chromium dioxide pigments having coercive forces of from 32 to 48 kA/m may be used. Advantageously, pigments having coercive forces of from 40–55 kA/m are used for the lower layer and those having coercive forces of 55–60 kA/m for the upper layer (measured on the tape in each case).

A lower layer containing a $CrO_2$ pigment having a coercive force of about 44 kA/m of the lower layer and an upper layer containing a Co—$Fe_2O_3$ pigment having a coercive force of about 58 kA/m of the upper layer have proven particularly advantageous for a novel magnetic recording medium.

The novel magnetic recording medium is produced in a manner known per se.

The binders conventionally used for the production of magnetic layers, for example copolymers of vinyl chloride, vinyl acetate and vinyl alcohol, copolymers of vinylidene chloride and acrylonitrile, polyvinyl acetals, such as polyvinyl formals, polyester/poly-urethanes, polyurethane elastomers or polyether elastomers, phenoxy resins or epoxy resins, may be used as binders for the dispersion of the magnetic pigment.

These binders may be used individually or in combination with one another, and other additives may be added to these binders. The weight ratio of binder to ferromagnetic substance in the mixture is such that there are from 8 to 400, preferably from 10 to 200, parts by weight of the binder per 100 parts by weight of the ferromagnetic substance.

Suitable dispersants are fatty acids of about 12 to 18 carbon atoms and of the formula $R_1$ COOH, where $R_1$ is alkyl or alkenyl, each of about 11 to 17 carbon atoms, for example caprylic acid, capric acid, lauric acid, Myristic acid, palmitic acid, stearic acid, oleic acid, elaidic acid, linoleic acid, linolenic acid, stearolic acid and the like, metal soaps which contain salts of the alkali metals (Li, Na, K, etc.) or salts of the alkaline earth metals (Mg, Ca, Ba, etc.) and the abovementioned fatty acids, fluorine-containing compounds of the abovementioned fatty esters, amides of the abovementioned fatty acids, polyalkylene oxide-alkylphosphoric esters, lecithin, quaternary trialkylpolyolefinoxyammonium salts and the like. Higher alcohols of 12 or more carbon atoms and sulfuric esters thereof may additionally be used. These dispersants are generally used in an amount of from about 1 to 20 parts by weight per 100 parts by weight of the binder.

Suitable lubricants which may be used in the novel recording medium comprise silicone oils, such as dialkylpolysiloxanes, dialkoxypolysiloxanes, monoalkylmonoalkoxypoly-siloxanes, phenylpolysiloxanes and fluoroalkylpolysiloxanes, fine electrically conductive powders, such as graphite powder, fine inorganic powders, such as molybdenum disulfide powder and tungsten disulfide powder, fine plastics powders, such as polyethylene, poly-propylene, ethylene/vinyl chloride copolymer and polytetrafluoroethylene powders, α-olefin polymers, unsaturated aliphatic hydrocarbons which are liquid at normal temperature and in which the double bond of the n-olefin is present at a terminal carbon atom (number of carbon atoms: about 20), fatty esters which are obtained from monobasic $C_{12}$–$C_{20}$-fatty acids and monohydric $C_3$–$C_{12}$-alcohols, and fluorohydrocarbons. These lubricants are generally used in an amount of from about 0.2 to 20 parts by weight per 100 parts by weight of the binder.

Typical abrasives which may be used in the novel recording medium comprise alumina, silicon carbide, chromium dioxide ($Cr_2O_3$), corundum, diamond, synthetic corundum, garnet, emery (main component: corundum and magnetite) and the like. These abrasives generally have a Mohs' hardness of 5 or more and a mean particle size of from 0.05 to 5 µm, preferably from 0.1 to 2 µm and are generally used in an amount of from 0.5 to 20 parts by weight per 100 parts by weight of the binder. In a preferred embodiment, the abrasive is present only in the upper layer.

Antistatic agents which may be used in the novel recording medium comprise fine electrically conductive powders, such as carbon black and carbon black-containing graft polymers, natural surfactants, such as saponine, nonionic surfactants, such as those based on alkylene oxide, on glycerol and on glycidol, cationic surfactants, such as higher alkylamines, quaternary ammonium salts, heterocyclic compounds, such as pyridine and the like, phosphonium or sulfonium salts and the like, anionic surfactants which contain acid groups, such as carboxyl, sulfo, phosphonyl, sulfate and phosphate groups and the like, and amphoteric surfactants, such as amino acids, aminosulfonic acids and sulfuric or phosphoric esters of aminoalcohols and the like.

The abovementioned fine electrically conductive powders are generally added in an amount of from 0.2 to 20 parts by weight per 100 parts by weight of the binder, and the surfactants are generally added in an amount of from 0.1 to 10 parts by weight per 100 parts by weight of the binder.

These surfactants may be used individually or in combination with one another. They are generally used as antistatic agents but in some cases for other purposes, for example for improving the dispersibility, the magnetic properties and the lubricating properties or as an assistant for the formation of the coating.

The magnetic powder is thoroughly mixed in a suitable amount of solvent, a suitable amount of a dispersant and a binder mixture and is subjected to preliminary dispersing, which may be carried out, for example, in a dissolver, a kneader, a colloid mill, a ball mill or another unit providing high shear forces.

The second stage of the dispersing is then effected, for example, in a bead mill whose milling intensity can be controlled by varying the size and amount of the grinding medium, the speed and the coat throughput.

To obtain a very narrow pigment particle size distribution, the magnetic dispersion is preferably fed in a plurality of passes from a first storage vessel via one or more bead mills mentioned by way of example into a second storage vessel.

After the end of the fine dispersing stage, the remaining binder fractions or additives, are, if required, mixed with the magnetic dispersion.

The subsequent coating of the nonmagnetic substrate with the magnetic dispersions is carried out according to the prior art, for example, by means of a reverse roll coater, matrix printer or extruder coater.

In a particularly preferred embodiment of the invention, the two layers are applied, for example by means of a dual-slot coater, directly in succession without intermediate drying, by applying the magnetic dispersions from two outlet slots only a few mm to cm apart onto the substrate. Such coating apparatuses are described, for example, in DE-A 42 26 138, DE-A 42 26 139 and DE-A 19 04 930 of the same Applicant.

However, applications may also be effected by the wet-on-dry method, by first casting the lower layer on the substrate, drying it and then casting the upper layer thereon.

Films of polyester, such as polyethylene terephthalate or polyethylene naphthalate, poly-olefins, such as polypropylene, cellulose derivatives, such as triacetate or polycarbonates may be used as substrates. The thickness of the substrate is usally 5–150 $\mu$m.

The further processing of the coated materials, such as the smoothing of the surface by means of calenders, slitting and making up, is carried out in a known manner.

In order to demonstrate the advantages of the novel procedure, the following properties for magnetic tape slit to 3.81 mm are described by way of example.

The storage characteristics of the magnetic recording media thus produced were always measured in comparison with reference tape U 564 W (IEC II) of BASF.

Specifically, the following were measured (all data in dB):

| | | |
|---|---|---|
| MOL | = | output level at 315 Hz |
| SOL | = | output level at 10 kHz |
| FM | = | sensitivity difference between 3150 Hz and 315 Hz |
| FH | = | sensitivity difference between 10 kHz and 315 Hz |
| BN | = | bias noise |
| SP | = | signal to print-through ratio |

EXAMPLE 1

(all data in parts by weight)

| | | |
|---|---|---|
| a) Lower layer | | |
| Co-doped $\gamma$-Fe$_2$O$_3$ (BET 22 m$^2$/g, H$_c$ (measured on the tape) 53.3 kA/m) | | 15 |
| Dispersant | | 0.45 |
| Polyester/polyurethane | 2.9 | |
| Lubricant | | 0.1 |
| Solvent (tetrahydrofuran) | 28 | |
| b) Upper layer | | |
| Co-doped $\gamma$-Fe$_2$O$_3$ (BET 42 m$^2$/g, H$_c$ (measured on the tape) 58.7 kA/m) | | 14 |
| Lubricant | | 1.04 |
| Al$_2$O$_3$ (Alox P 10 very fine) | 0.28 | |
| Vinyl polymer | 0.7 | |
| Polyester/polyurethane | 1.3 | |
| Dispersant | | 0.5 |
| Solvent (tetrahydrofuran) | 25 | |

The two layers were applied by means of a double extruder coater by the wet-on-wet method so that the lower layer had a thickness of 2 $\mu$m when dry and the upper layer a thickness of 4 $\mu$m when dry. The PET substrate was 7 $\mu$m thick. After drying and calendering, the material was slit to 3.81 mm width and made up in compact cassettes of the Philips type.

EXAMPLE 2

The procedure was as in Example 1, except that the magnetic pigment of the lower layer was acicular CrO$_2$ having a BET value of 21 m$^2$/g and an H$_c$, measured on the tape, of

Comparative Example 1

The procedure was as in Example 2, except that the thickness of the lower layer was 4 $\mu$m and that of the upper layer 2 $\mu$m.

Comparative Example 2

Only the upper layer was cast, as a monolayer having a thickness of 6 $\mu$m when dry.

The table below shows the results of the novel examples and of the comparative examples in comparison with two commercial recording media, all relative in each case to the abovementioned reference tape.

TABLE

| | MOL | SOL | BN | SP | FM | FH |
|---|---|---|---|---|---|---|
| Example 1 | +1.5 | +2.2 | +3.5 | 50 | −0.1 | +1.2 |
| Example 2 | +1.9 | +2.2 | +3.4 | 52 | −0.1 | +1.2 |
| Comparative Example 1 | +2.1 | +1.3 | +2.0 | 53 | −0.6 | +0.7 |

TABLE-continued

|  | MOL | SOL | BN | SP | FM | FH |
|---|---|---|---|---|---|---|
| Comparative Example 2 | +0.7 | +2.2 | +3.8 | 50 | 0 | +1.5 |
| Fuji Z II | +0.5 | +1.9 | +4.2 | 53.9 | −0.9 | +0.7 |
| TDK SA-X | +1.1 | +3.4 | +3.2 | 52.5 | −0.5 | +1.3 |

We claim:

1. A magnetic recording medium consisting of a nonmagnetic substrate and at least two magnetic layers applied thereon, both layers containing magnetizable metal oxides as magnetic pigment, the magnetic pigment consisting of cobalt-containing FeOx ($1.33 \leq x \leq 1.5$) and present in the uppermost layer having a higher BET value than the magnetic pigment contained in the lowermost layer, and the layer thickness of the uppermost layer being greater than that of the lowermost layer, wherein the thickness of the uppermost layer is in the range of 3.1–5 μm and that of the lowermost layer is in the range of 1.1–3 μm, and wherein the magnetic pigment contained in the lowermost layer is $Cr-O_2$.

2. A magnetic recording medium as claimed in claim 1, wherein the coercive force of the uppermost layer is 55–60 kA/m and that of the lowermost layer is 40–55 kA/m.

3. A magnetic recording medium as claimed in claim 1, wherein the uppermost layer additionally contains a nonmagnetic pigment.

4. A magnetic recording medium as claimed in claim 3, wherein the nonmagnetic pigment is finely divided $Al_2O_3$.

5. A magnetic recording medium as claimed in claim 1, wherein the magnetic pigment contained in the uppermost layer has a BET value of from 40 to 45 $m^2/g$ and the magnetic pigment contained in the lowermost layer has a BET value of from 20 to 25 $m^2/g$.

6. An audio tape for the IEC-II bias setting which consists essentially of the magnetic recording medium of claim 1.

* * * * *